(12) United States Patent
Lückel et al.

(10) Patent No.: US 8,988,018 B2
(45) Date of Patent: Mar. 24, 2015

(54) ARRANGEMENT HAVING AN OSCILLATING MOTOR AND A METHOD FOR CONTROLLING AN OSCILLATING MOTOR

(75) Inventors: Kris Lückel, Darmstadt (DE); Frank Stefan Skopp, Wiesbaden (DE)

(73) Assignee: Braun GmbH, Kronberg (DE)

( * ) Notice: Subject to any disclaimer, the term of this patent is extended or adjusted under 35 U.S.C. 154(b) by 107 days.

(21) Appl. No.: 12/744,684

(22) PCT Filed: Nov. 21, 2008

(86) PCT No.: PCT/EP2008/009855
§ 371 (c)(1),
(2), (4) Date: May 26, 2010

(87) PCT Pub. No.: WO2009/077053
PCT Pub. Date: Jun. 25, 2009

(65) Prior Publication Data
US 2010/0301783 A1 Dec. 2, 2010

(30) Foreign Application Priority Data

Dec. 14, 2007 (DE) .......................... 10 2007 060 466

(51) Int. Cl.
*H02P 25/02* (2006.01)
(52) U.S. Cl.
CPC .................................. *H02P 25/027* (2013.01)

USPC ............................................................ 318/127
(58) Field of Classification Search
USPC ........................................... 318/119–134, 686
See application file for complete search history.

(56) References Cited

U.S. PATENT DOCUMENTS

| 5,424,637 | A | 6/1995 | Oudyn et al. |
| 5,539,608 | A * | 7/1996 | Hurley et al. ................. 361/152 |
| 7,180,254 | B2 | 2/2007 | Klemm et al. |
| 2005/0146296 | A1* | 7/2005 | Klemm et al. ................. 318/119 |
| 2005/0275294 | A1* | 12/2005 | Izumi et al. ..................... 310/15 |

* cited by examiner

*Primary Examiner* — Derek Rosenau
(74) *Attorney, Agent, or Firm* — Jay A. Krebs

(57) ABSTRACT

An arrangement is provided having an oscillating motor, a control circuit for controlling the motor, a sensor arrangement for determining an electric characteristic of the motor at a predetermined measuring time or in a predetermined measuring position during an oscillation process, and a processor for determining a movement variable of the motor by means of at least the electric characteristic and a constant inductivity value of the motor. The control circuit in the operating state controls the motor as a function of the movement variable, and the measuring time or the measuring position is predetermined such that the inductivity of the motor remains approximately constant at least in a given current interval, even with different currents through the motor.

6 Claims, 4 Drawing Sheets

Figure 1:
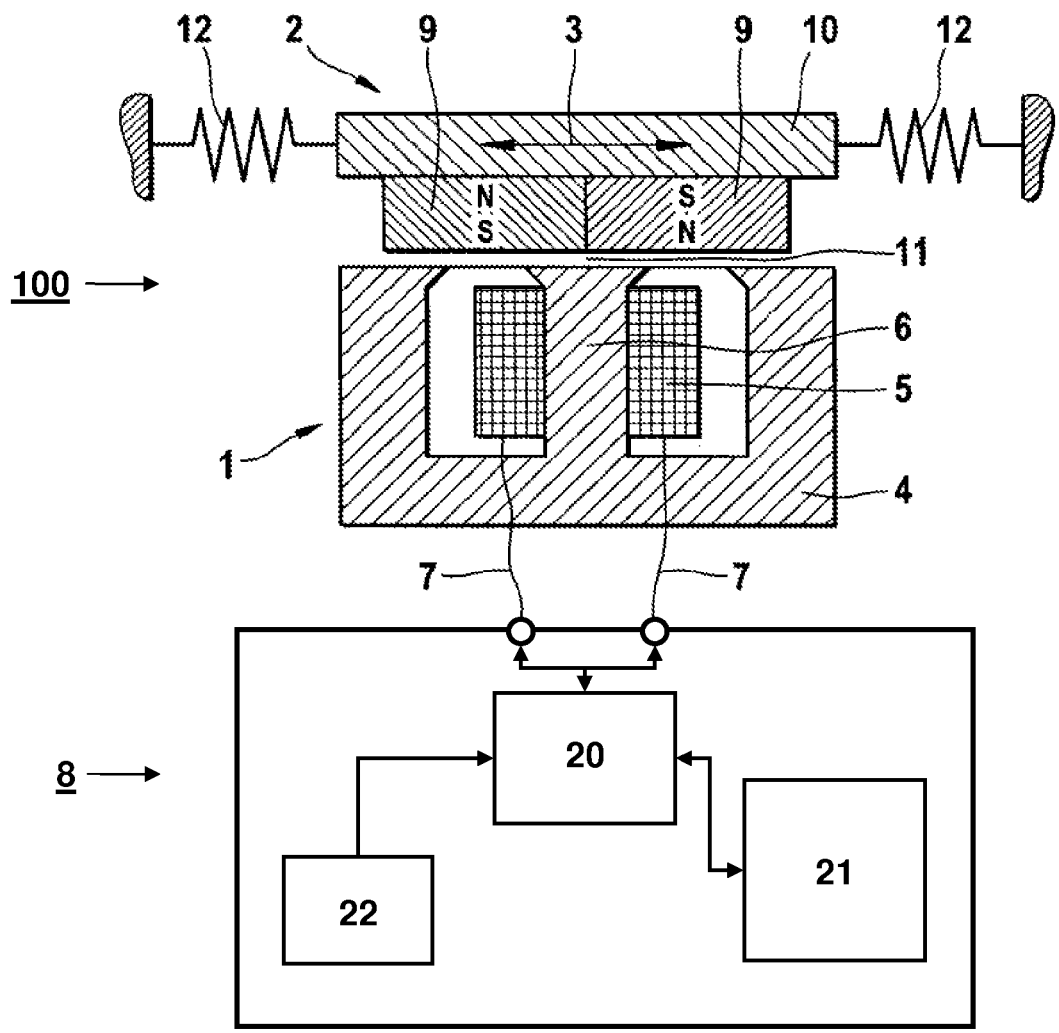

ARRANGEMENT HAVING AN OSCILLATING MOTOR AND A METHOD FOR CONTROLLING AN OSCILLATING MOTOR

The invention relates to an arrangement having an oscillating motor and a method for controlling an oscillating motor (direct drive), in which a characteristic of the motor is used to control the motor, in particular for amplitude stabilizing control at varying motor loads.

One such arrangement and one such method are known from DE 102 29 319 A1, in which a movement variable of the oscillating motor is determined at a point in time at which a current is fed to a coil of the motor in order to set the motor into an oscillating movement. The movement variable of the motor is used by a control circuit to determine the motor's interdependence of the future power supply.

The disadvantage of the described arrangement and the described method is that the inductivity of the motor is presumed to be constant. In fact, however, the inductivity depends on the position of the motor components to one another, the current consumption and the change in current at the measuring time. Neglecting the non-linear inductivity can lead to the motor control becoming unstable or to the control yielding a predetermined amplitude, in particular if the motor is subjected to a heavy load.

U.S. Pat. No. 5,424,637 describes how the position of an actuator anchor can be determined for an actuator coil. At the same time, the non-linear inductivity characteristics of the actuator can be taken into consideration in that the inductivity values are determined as a function of the position of the anchor and the actuator coil current by means of software from a "look-up table" or from a mathematical equation.

However, at the same time there is the disadvantage that such tables and the necessary software cannot be easily or inexpensively produced.

Therefore, the object of the invention is to provide an arrangement and a method for controlling an oscillating motor in which the known disadvantages can be avoided and which can be inexpensively produced.

The object is achieved by an arrangement according to Claim 1 and a method according to Claim 6. The dependent claims describe other embodiments.

The arrangement has an oscillating motor (direct drive) that in the operating state is controlled by a control circuit. In the operating state, a sensor arrangement determines an electric characteristic of the motor at a predetermined measuring time during an oscillation process or at a measuring position (i.e. during the movement of the motor from its "off" position) and in the operating state, a processor determines a movement variable of the motor (for example, the speed of the rotor) from at least the electric characteristic and a constant, predetermined inductivity value of the motor, wherein the measuring time or the measuring position are predetermined such that the inductivity of the motor remains approximately constant at least in a given current interval, even with different currents through the motor. At the same time, the measuring time or the measuring position has been determined by means of an optimization that minimizes any deviation from a constant inductivity value. In particular, in the given current interval the deviation of the inductivity values encountered should not exceed 10% or more of a mean inductivity value (i.e. of an inductivity value assumed to be constant), wherein deviations of ±5% allow for more precise control, deviations of ±2.5% allow for even better control and deviations of ±1% provide for excellent control. The given current interval ($I_1$, $I_2$), in which the approximately constant inductivity value is supposed to be reached, is in the generally accessible current range, which ranges from $I_0=0$ A to $I_{max}$, wherein $I_{max}$ is a function of the given motor and depends on the internal resistance R of the coil, the voltage already provided by the voltage source and the voltage induced by movement. The first current value of the interval $I_1$ is typically at a lower percent of the maximum current, $I_1 \approx 1\text{-}10\% \, I_{max}$), because the inductivity value in the case of a current increasing from zero also increases rapidly as a result of the rapid change in current, which conflicts with the optimization to an approximately constant value, and which also therefore necessitates that measurements to determine the temporal change in current $dI/dt \approx \Delta I/\Delta I = I(t_b) - I(t_a))/(t_b - t_a)$ be made very quickly in order to obtain a dependable value for the change in current. Measuring the change in current is necessary in order to determine the movement variable of the motor arising from the electric characteristic. The second current value of the interval is approximately $I_2 \approx 15\text{-}80\% \, I_{max}$, wherein in this case the minor increase at high currents compared to the maximum current leads to a value influenced by noise; as a result, the change in current cannot be reliably determined. That is why various embodiments use the equations $I_2 \approx 15\text{-}50\% \, I_{max}$ or $I_2 \approx 20\text{-}40\% \, I_{max}$ or $I_2 \approx 20\text{-}30\% \, I_{max}$. As is described in DE 102 29 319 A1, typically two measurements are taken to determine the predetermined measuring time (in DE 102 29 319 A1 this is a fixed predetermined time) or to determine the measuring position to determine the current and the change in current, wherein $I=(I(t_a)+I(t_b))/2$ and $dI/dt \approx \Delta I/\Delta I = I(t_b) - I(t_a))/(t_b - t_a)$ are. If the measuring time is preset at $t_x$, the two measurements can then be taken at the times $t_a = t_x - \Delta t/2$ and $t_b = t_x + \Delta t/2$. In this case, $\Delta t$ in particular can be caused by the speed of the measuring system because the increase in the variable to be measured should not change too much between the two measuring points.

An oscillating motor is generally designed as a system in which energy is conducted by means of a coil that operates as an electromagnet in order to set a rotor attached to a permanent magnet into rotation and to keep it within a defined rotation. This allows for the correct amount of energy always to be conducted at the right time; thus it is necessary to measure the movement of the electric motor.

Oscillating motors (for example, linearly oscillating direct drives like those used in electric shavers) are oscillating resonance systems in which the rotor, which may be configured, for example, as a permanent magnet or which has a permanent magnet, is set into rotation by a magnetic field that is generated by a stator coil through which current flows through intermittently and wherein the rotor is returned to its starting position by reset forces, for example elastic forces. For example, the oscillating motor can be configured as a linearly vibrating motor or as a motor that oscillates around an axis. The dimensions of the rotor and the reset forces determine the resonance frequency. Regardless of its oscillation amplitude, the oscillating motor always oscillates at the same frequency so that the frequency of oscillation essentially does not change when the motor is loaded, as is the case in a direct current motor; rather, the oscillation amplitude is reduced. If the motor load varies, the oscillating motor is kept at the same oscillation amplitude by means of a control by means of the knowledge of the oscillation amplitude or the rotor speed at a specific point in time. The movement variable, typically the rotor speed or the oscillation amplitude, can be measured directly. However, this requires additional sensors (for example, Hall sensors) and thus additional costs and thus additional construction volume as well. For that reason, in the case of an oscillating motor, the movement variable necessary for control is typically determined indirectly and without the use of sensors by using the stator coil as a sensor, such as the one described in DE 102 29 319 A1. For example, the motor voltage applied to the coil and the current flowing through the coil are measured there and the rotor speed can then be calculated with knowledge of the motor inductivity.

However, the arrangement described herein and the corresponding method can also be designed with an additional sensor that also determines the movement variable indirectly by means of an electric characteristic of the motor; the motor inductivity is necessary for this calculation.

In one embodiment of the arrangement, a measuring time or a measuring position is predetermined in each instance for at least two oscillation amplitudes in such a way that the inductivity of the motor remains approximately constant in the event of and for different oscillation amplitudes, at least in an interesting current interval. At the same time, the measuring times or the measuring positions was determined by means of an optimization in which a deviation value was minimized. This allows a single, constant inductivity value to then be used for control of all oscillation amplitudes.

In another embodiment, a stator coil of the motor forms the sensor arrangement.

In a further embodiment, the arrangement has a memory to store the measuring time or the measuring position. The memory can also or alternatively be used to store the constant inductivity value.

In an additional embodiment, the control circuit and/or the processor and/or the memory are realized by means of a microcontroller, which saves space.

The method for controlling an oscillating motor comprises the following steps:
a) providing a measuring time or a measuring position within an oscillation period of the motor to determine an electric characteristic of the motor, wherein the measuring time or the measuring position is chosen so that the inductivity of the motor is approximately constant, at least in a given current interval, even with different currents (i.e. the inductivity can be approximated by means of a constant inductivity value in the given current interval), wherein the measuring time or the measuring position is determined in particular by an optimization that minimizes any deviation of inductivity values from a constant inductivity value;
b) measuring the electric characteristic of the motor at the measuring time or at the measuring position (movement of the motor from its "off" position);
c) calculating a movement variable of the motor from the electric characteristic and a constant inductivity value;
d) controlling the motor in relation to the calculated movement variable.

In one embodiment of the method, the step of providing in each instance comprises providing a measuring time or a measuring position for at least two different oscillation amplitudes, wherein the measuring times or measuring positions are determined in such a way that the inductivity of the motor is approximately constant for all oscillation amplitudes, at least within an interesting current interval, even with different currents through the motor. In this respect, the measuring times or measuring positions are determined in particular by means of an optimization that minimizes any deviation of inductivity values from a constant inductivity value.

The invention also relates to a small electric device, in particular an electric toothbrush or an electric shaver, in which an arrangement according to the invention is used or one that is equipped to carry out a method according to the invention.

Figure 2:
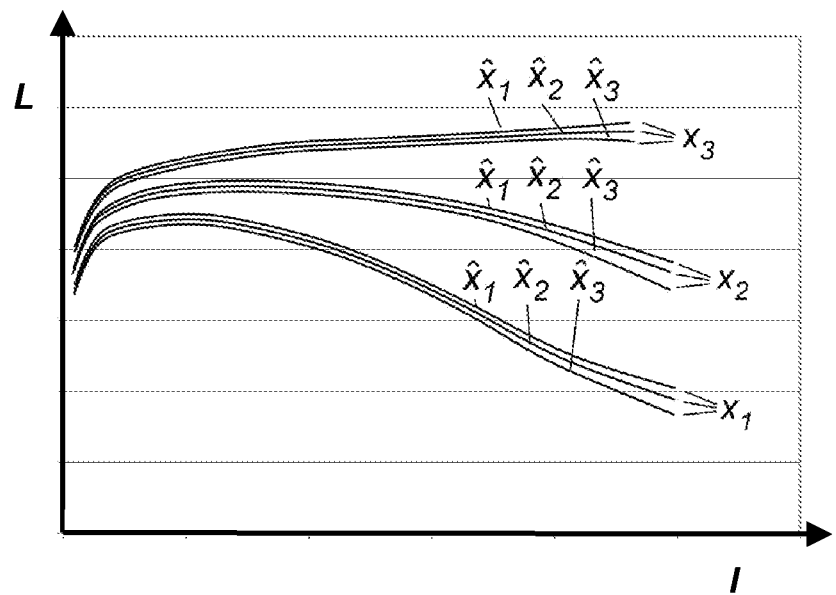
Figure 3:
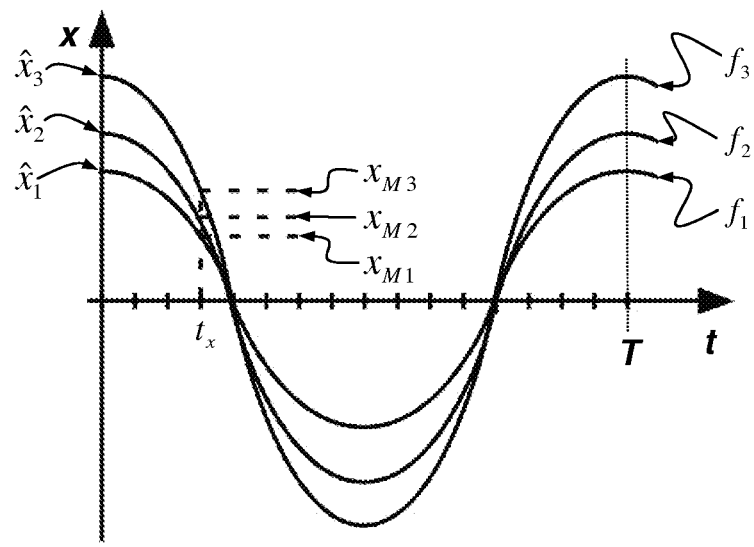
Figure 4:
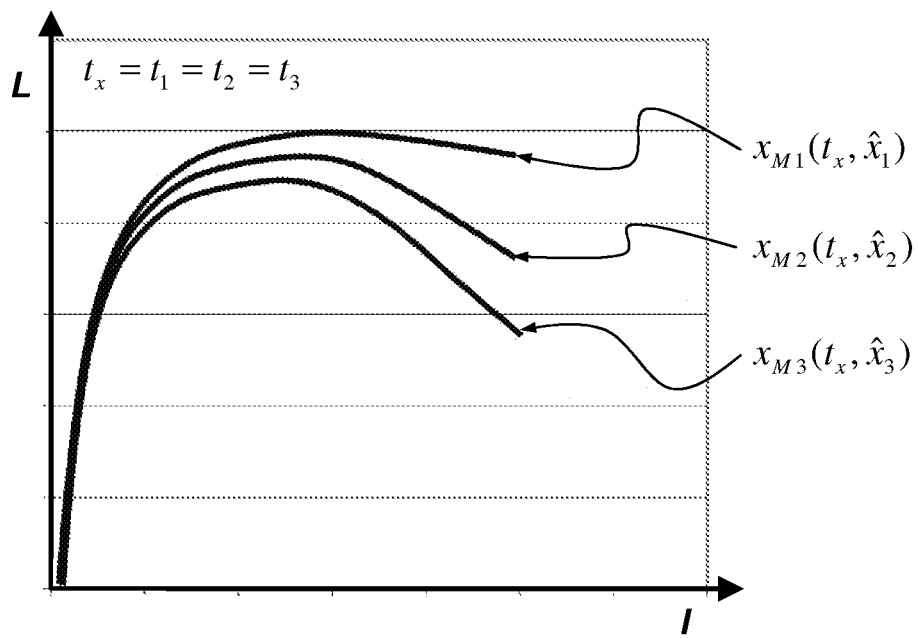
Figure 5:
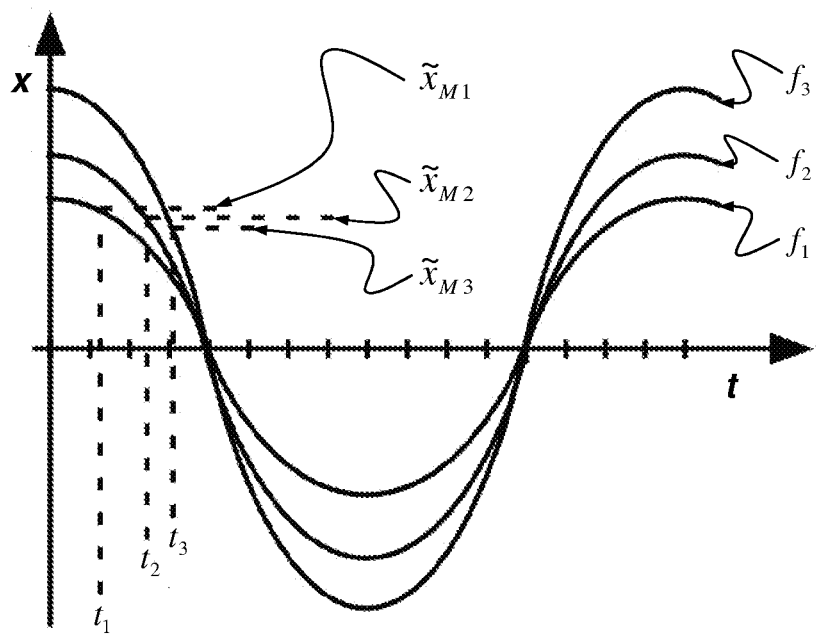
Figure 6:
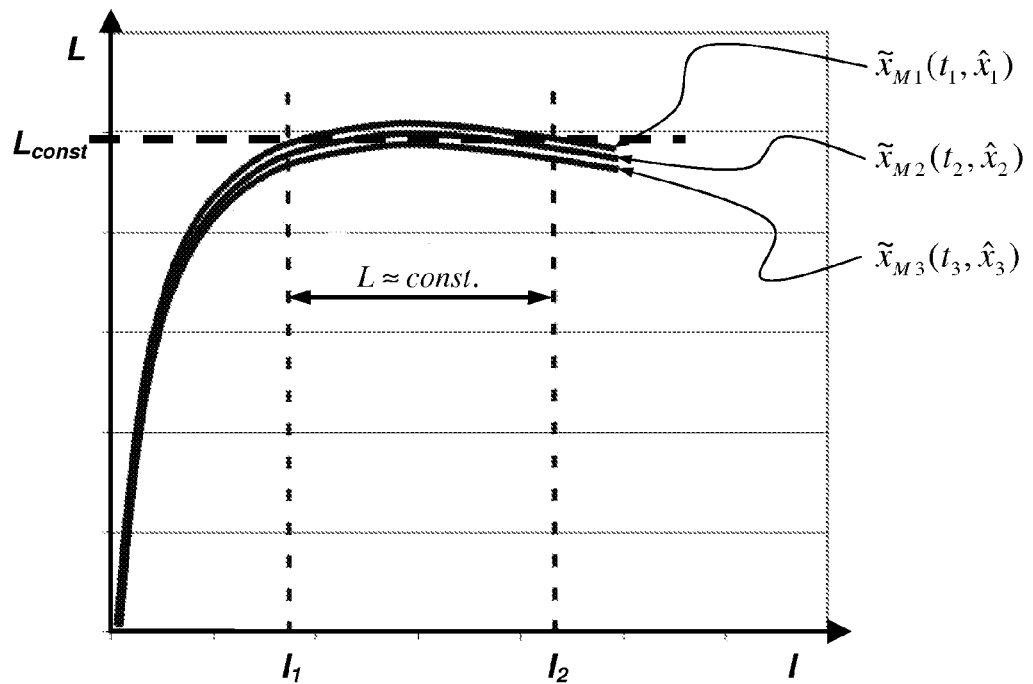
Figure 7:
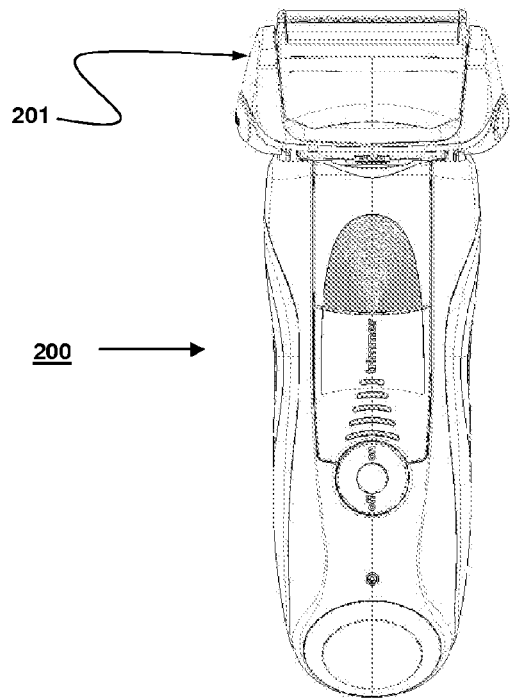

The invention is described in detail below by a detailed discussion of exemplary embodiments and with reference to figures. The figures show:

FIG. 1 a schematic drawing of one embodiment of an arrangement according to the invention having an oscillating motor;

FIG. 2 an exemplary drawing of the functional relation of the inductivity of the motor to the current consumption for various oscillation amplitudes and measuring positions;

FIG. 3 a drawing of the relation of the measuring position to a fixed measuring time during periods of oscillation of the motor that have different oscillation amplitudes;

FIG. 4 a exemplary drawing of the functional relation of the inductivity of the motor to the current consumption at a fixed measuring time and, consequently, different given measuring positions for various oscillation amplitudes;

FIG. 5 a drawing of the relation of the measuring position at a different measuring time to periods of oscillation of the motor having different oscillation amplitudes;

FIG. 6 an exemplary drawing of the functional relation of the inductivity of the motor to the current consumption at a varying measuring time and, consequently, given measuring positions for various oscillation amplitudes, wherein the measuring time in each instance is chosen so that the inductivity is approximately constant for an interesting area; and FIG. 7 an exemplary small electric device in which an arrangement as described is used.

FIG. 1 shows, as an example, a schematic drawing of an exemplary embodiment of an oscillating motor 100 as an oscillating linear motor. Such a linear motor is used, for example, in electric shavers. An oscillating motor may also oscillate in a rotating fashion in relation to an axis. The linear motor 100 shown in FIG. 1 has a stationary arranged stator 1 and a rotor 2 that can carry out a linear movement in the directions shown by a double arrow 3. Alternatively, the degrees of freedom of movement of the stator 1 can be designed in accordance with the rotor 2, i.e., the stator 1 can be replaced by a component whose mobility corresponds to the rotor 2 but which in other respects has the functional features of the stator 1. Because the drawing of the invention is simplified in this respect, it is used below only to describe the exemplary embodiment having the stationary arranged stator 1. In this instance, the stator 1 consists of an iron core 4 formed in the shape of an "E" and a coiled wire stator coil 5. The stator coil 5 is coiled around a middle beam 6 of the iron core 4 and is connected electrically to a control device 8 via connecting lines 7. The rotor 2 has two permanent magnets 9, of which in each instance one of its poles is attached to a carrier plate 10 and both of which are arranged close to one another in an antiparallel orientation. The permanent magnets 9 reach nearly to an air gap 11 on the front side of the center beam 6 of the iron core 4. Like the iron core 4, the carrier plate 10 consists of an iron substance that is attached to two opposing sides, the end of each of which has a coil spring 12. The other ends of the coil spring 12 are suspended in a stationary fashion, for example from a housing of a small electric device in which the linear motor is installed so that the rotor 2 can carry out linear oscillating movements in the directions shown by the double arrow 3. Of course, this embodiment of a linearly oscillating direct drive is only an example; the term "oscillating motor" is also intended to comprise all other known or suggested embodiments of direct drives.

In the oscillating motor's operating state, a flow of current through the stator coil 5 is produced by a corresponding control by means of the control device 8 so that a magnetic field is generated in the iron core 4. The magnetic field affects the permanent magnets 9, in particular in the area of the front surface of the center beam 6 of the iron core 4, and, in the case of the geometry represented in FIG. 1, causes the rotor 2 to move sideways in relation to the stator 1. The direction of the movement depends on the direction of current in the stator coil 5. By varying the flow of current through the stator coil 5, in which generally the direction of current also varies, and assisted by the coil springs 12, the rotor 2 can be set into a linearly oscillating movement.

The control of the stator coil 5 is time-coordinated to the movement of the rotor 2 by the control device 8 in order in each instance to achieve the desired effect by means of the generated flow of current through the stator coil 5. In addition, the energy conducted via the magnetic field of the stator coil 5 to the rotor 2 depends in each instance on the respective needs. In particular, this energy is measured in such a way that the oscillation amplitude is kept as constant as possible, even when the rotor 2 is subjected to a fluctuating load. The fluctuating load is counterbalanced by a corresponding variation in the flow of current through the stator coil 5.

In the embodiment shown, the control device 8 consists of a measuring and control circuit 20 by means of which an electric characteristic of the motor is measured at least at one given measuring time (or at one given measuring position) within the motor's period of oscillation. The electric characteristic is converted by means of a processor 21 and an inductivity value of the stator coil 5 into a movement variable of the motor. The current to the motor is then controlled by the measuring and control circuit 20 on the basis of the movement variable. The control device 8 may have a memory 22 to store the measuring time (or the measuring position); an induction value of the motor may also be stored in the memory 22.

To keep the oscillation amplitude at a constant value, it is necessary in each instance to determine the oscillation amplitude or a related measurement. The actual oscillation amplitude or a related measurement, such as, for example, the rotor speed at a given measuring time within the period of oscillation (wherein a measuring position, i.e. the movement of the motor from its "off" position, is clearly allocated to the measuring time during a periodic oscillation), are movement variables of the motor. Because the oscillation frequency in a system oscillating in resonance is known, the oscillation amplitude can be determined from the rotor speed at a measuring time or from a measuring position within the period of oscillation. To determine the movement variable, an electric characteristic of the motor, for example the voltage $U_L$ induced by the moved permanent magnets 9 in the stator coil 5, is used.

The voltage $U_M$ applied to the motor coil is the product of the sum of the fall of voltage on the ohmic resistance of the coil, the self-induced voltage $U_L$ and the movement-induced voltage $U_i$. This can also be generally expressed by Kirchhoff's Voltage Law:

$$U_M = I \cdot R + \frac{\partial \psi}{\partial I} \frac{\partial I}{\partial t} + \frac{\partial \psi}{\partial x} \frac{\partial x}{\partial t},$$

wherein I is the current flowing through the coil, R is the ohmic resistance of the coil, φ is the linked magnetic flow, x is the rotor position and t is the time. $\partial \phi / \partial I = L = $ const. is used for the assumption of a constant inductivity. However, the assumption of a constant inductivity is only of limited use and can lead, for example, to control instability at high motor loads. As is well known, the inductivity L is not constant and the non-linear, differential inductivity $L_{diff}(I) = \partial \phi / \partial I$ must be taken into consideration. Furthermore, $\partial \phi / \partial I = k_m = $ const. is identified as the motor constant.

DE 102 29 319 A1 describes the relation between the characteristic and the movement variable, wherein this relation should be deemed incorporated by reference to that document. The voltage $U_M$ applied to the stator coil 5 is the product of the sum of the voltage $U_R$ that falls on the ohmic resistance of the stator coil 5, the self-induced voltage $U_L$ and the voltage $U_i$ induced by the permanent magnets 9.

$$U_M = U_R + U_L + U_i = R \cdot I + L \cdot dI/dt + v \cdot k_M$$

At the same time, the voltage $U_R$ falling on the ohmic resistance is calculated from the product of the resistance value of the stator coil R and current I; the induced voltage $U_i$ is the product of the rotor speed v and a proportionality constant, the motor constant $k_M$, and at the same time the self-induced voltage $U_L$ is obtained by the product of the inductivity L of the motor at the given measuring time and the temporary change in current dI/dt. The inductivity L of the motor depends on the current consumption I of the motor, the measuring time t or the measuring position x (the movement of the motor from its "off" position) that is clearly associated with it and the temporary change in current dI/dt:

$$U_L = L(I, dI/dt, t\ bzw\ x) \cdot dI/dt$$

If the variables are known, the rotor speed v can be determined from the measurement of the voltage $U_M$ falling on the stator coil 5. At the same time, in previous applications the inductivity L was assumed to be constant, which, however, in certain circumstances (certain motor loads) led to control instabilities. In principle, the inductivity L can be calculated as a function of current consumption I, measuring time t or measuring position x and change in current dI/dt and can then be read out from a "look-up" table, or the inductivity L can be calculated by a polynomial approximation or a similar procedure. In the latter case, only the coefficients of the approximation function are stored and not an entire "look-up table." However, these two procedures require more components (memory, processor) either to store the "look-up table" or to calculate the approximation function. However, the necessary memories and/or processors cannot be manufactured inexpensively or made in a space-saving manner. Therefore, an alternative is described below that avoids the disadvantages of a "look-up table" or an approximation function. In this respect, the measuring position or the measuring time are essentially chosen so that the inductivity L of the motor is approximately constant at least in an interesting area, even when current consumption I varies. Then, because of specially chosen measuring times or measuring positions, work can continue with a single, constant inductivity value L=const. Consequently, large memories or processors for "look-up tables" or for polynomial approximations are not necessary. Consequently, if these procedures are used for several oscillation amplitudes to be kept stable, each oscillation amplitude is assigned a corresponding measuring time or a measuring position within the period of oscillation, wherein the measuring times or measuring positions are chosen so that the inductivity L of the motor is approximately constant for all oscillation amplitudes at least in an interesting area of varying current consumption. To optimize the measuring times or measuring positions, a known optimization algorithm, for example, can be used to minimize the quadratic deviation from a mean inductivity value. To that end, the inductivity of the motor is measured using a suitable test bed for the various parameters, such as measuring time and/or measuring position, current consumption and oscillation amplitude, and the measurements are used for the optimization.

FIG. 2 shows the principle functional course of the inductivity L of the motor vis-à-vis the current l consumed by the motor for various motor positions $x_1$, $x_2$ and $x_3$ at various oscillation amplitudes $\hat{x}_1$, $\hat{x}_2$ and $\hat{x}_3$. It is clear that the inductivity L in particular greatly depends on the motor position x (in this case: the movement of the rotor from the "off" position). Typical values for the oscillation amplitudes that are used in the case of a linearly oscillating direct drive like the one used in a dry shaver are approximately: $\hat{x}_1=1$ mm, $\hat{x}_2=1.4$ mm and $\hat{x}_3=1.7$ mm.

FIG. 3 shows the functional course of the motor position x as a function of the time t for the various oscillation amplitudes $\hat{x}_1$, $\hat{x}_2$ and $\hat{x}_3$. At the same time, the functions $f_1$, $f_2$ and $f_3$ correspond to the motor position courses for the oscillation amplitudes $\hat{x}_1$, $\hat{x}_2$ and $\hat{x}_3$. At the same time, the time T corresponds to the duration of oscillation within which an oscillation period is carried out, which in the linear motor oscillating in resonance is the same for all oscillation amplitudes $\hat{x}_1$, $\hat{x}_2$ and $\hat{x}_3$. At $3/16$ T, the measuring time $t_x$ is in accordance with the positive oscillation maximum; the zero point of the oscillation is achieved at $4/16$ T.

Thus, as is shown in FIG. 3, the electric characteristic of the motor for the various oscillation amplitudes $\hat{x}_1$, $\hat{x}_2$ and $\hat{x}_3$ is determined at a similar relative time $t_x$ in the linear motor's period of oscillation. Because of the different absolute measuring positions $x_{M1}$, $x_{M2}$ and $x_{M3}$, i.e. the positions at which the motor is always found at the measuring time $t_x$, this leads to a significantly different inductivity value L in the case of a given current consumption I for the various oscillation amplitudes. At an inductivity L that is assumed to be constant, this also results in the calculation of the movement variable (for example, speed v of the rotor) from the electric characteristic (for example, the voltage $U_M$ falling on the stator coil) having a corresponding error. In some cases, this means that the motor loses control and a large motor load cannot be counterbalanced by a correspondingly corrected power supply. The control circuit then becomes unstable. This problem becomes even more serious if the control circuit is used not only in the case of one oscillation amplitude but if several different oscillation amplitudes are supposed to be kept stable by the control circuit.

The given oscillation amplitudes of $\hat{x}_1=1$ mm, $\hat{x}_2=1.4$ mm and $\hat{x}_3=1.7$ mm at the constant measuring time $t_x=3/16$ T result in measuring positions (i.e. movements of the rotor) at $x_{M1}=0.38$ mm, $x_{M2}=0.53$ mm and $x_{M3}=0.65$ mm.

FIG. 4 shows as an example the functional course of the inductivity L of the motor vis-à-vis the current consumption I, wherein the various functional courses apply to the different oscillation amplitudes $\hat{x}_1$, $\hat{x}_2$ and $\hat{x}_3$ when measured at a fixed measuring time $t_1=t_2=t_3=t_x$; this leads to the different measuring positions $x_{M1}$ $x_{M2}$ and $X_{M3}$ at the measuring time. It is clear that in the case of varying current consumption I and different oscillation amplitudes $\hat{x}_1$, $\hat{x}_2$ and $\hat{x}_3$, significantly different inductivity values L prevail and there is no justification for assuming that inductivity L is constant at different current consumption I and at different oscillation amplitudes $\hat{x}_1$, $\hat{x}_2$ and $\hat{x}_3$.

In order to avoid this problem, it is recommended that the measuring time t chosen for the various oscillation amplitudes $\hat{x}_1$, $\hat{x}_2$ and $\hat{x}_3$ not be the same but for each oscillation amplitude a corresponding (typically different) measuring time $t_1$, $t_2$ and $t_3$ be chosen in such a way that an assumption of the inductivity L as (at least approximately) constant can be used, thus ensuring better stability of the control. FIG. 5 makes this clear. FIG. 5, like FIG. 3, shows the functional courses of the motor position x as a function of the time t for three different oscillation amplitudes $\hat{x}_1$, $\hat{x}_2$ and $\hat{x}_3$. An optimization process now sets different measuring times $t_1$, $t_2$ and $t_3$ for each oscillation amplitude. In FIG. 5, the electric characteristic for the oscillation amplitude $\hat{x}_1$ is determined at measuring time $t_1$; the motor is then at the measuring position $\tilde{x}_{1M1}$. Also, the electric characteristic for the oscillation amplitude $\hat{x}_2$ is determined at measuring time $t_2$; the motor is then at the measuring position $\tilde{x}_{M2}$ and the electric characteristic for the oscillation amplitude $\hat{x}_3$ is determined at measuring time $t_3$; the motor is then at the measuring position $\tilde{x}_{M3}$. In this exemplary drawing, the measuring positions $\tilde{x}_{M1}$, $\tilde{x}_{M2}$ and $\tilde{x}_{M3}$ are not located right next to one another but the exact measuring position (and/or the measuring time) is a question of the respective motor. The measuring times $t_1$, $t_2$ and $t_3$ can be chosen—in particular if the optimization so provides—so that the measuring positions $\tilde{x}_{M1}$, $\tilde{x}_{M2}$ and $\tilde{x}_{M3}$ coincide. As is clear from FIG. 2, the functional dependencies on the consumed current I and the oscillation amplitude are already significantly less than in the case of a similar measuring time $t_x$.

FIG. 6 shows as an example the functional dependence of the inductivity L of the motor vis-à-vis the current consumption I of the motor for various measuring positions $\tilde{x}_{M1}$, $\tilde{x}_{M2}$ and $\tilde{x}_{M3}$, wherein the various measuring positions $\tilde{x}_{M1}$, $\tilde{x}_{M2}$ and $\tilde{x}_{M3}$ were in each instance determined by the choice of a measuring time $t_1$, $t_2$ and $t_3$ for various oscillation amplitudes $\tilde{x}_{M1}$, $\tilde{x}_{M2}$ and $\tilde{x}_{M3}$. The measuring times $t_1$, $t_2$ and $t_3$ and thus the various measuring positions $\hat{x}_1$, $\hat{x}_2$ and $\hat{x}_3$ were chosen (in particular optimized) so that the inductivity L of the motor is essentially constant at different current consumption I at least in an interesting area (in this case: within the current consumption intervals $I_1$ to $I_2$); i.e., L≈const. The constant inductivity value $L_{const}$ can then be used to calculate the movement variable from the electric characteristic. FIG. 6 shows by means of a dotted line that the constant inductivity value $L_{const}$ for all oscillation amplitudes is determined as an average of the inductivity values within the current interval. The inductivity values are determined in particular by measuring the given parameters (such as oscillation amplitude and current consumption) and are then used as a basis for determining the constant inductivity value $L_{const}$. By an optimization, measuring times $t_1$, $t_2$ and $t_3$ for various oscillation amplitudes $\hat{x}_1$, $\hat{x}_2$ and $\hat{x}_3$ can be determined so that different measuring positions $\tilde{x}_{M1}$, $\tilde{x}_{M2}$ and $\tilde{x}_{M3}$ result. By optimizing the choice of measuring times for the various oscillation amplitudes $\hat{x}_1$, $\hat{x}_2$ and $\hat{x}_3$, an assumption of the inductivity L as a constant can be used in calculating the movement variable without at the same time leading to control instabilities. The method described or the corresponding arrangement can even be used in the case of only one oscillation amplitude in order to increase control stability. The constant inductivity value $L_{const}$ can be stored in a memory (reference No. 22 in FIG. 1) and can be read out from the memory to calculate the movement variable of the motor.

For a motor example from the dry shaver sector, the indicated oscillation amplitudes of $\hat{x}_1=1$ mm, $\hat{x}_2=1.4$ mm and $\hat{x}_3=1.7$ mm result in measuring positions (i.e. movements of the rotor) of $\tilde{x}_{M1}=0.65$ mm, $\tilde{x}_{M2}=0.76$ mm and $\tilde{x}_{M3}=0.90$ mm (the measuring times can be determined by means of the sine function). The motor inductivity (in the case of the exemplary linearly oscillating direct drive like the one used in a dry shaver) is in this case at approximately L=270 µH, which was approximately constant for all oscillation amplitudes within a current interval of $I_1=1.0$ A to $I_2=4.5$ A. At the same time, $I_1$ was approximately 5% of the maximum current and the system-based possibility $I_2$ was approximately 23% of the maximum current. An approximate constancy of 2% was achieved. In this connection, $L_{const}=270$ μH could be used as the constant inductivity value $L_{const}$ without leading to instabilities or to incorrectly adjusted oscillation amplitudes.

Thus to summarize, in other words, it is recommended that for a given oscillating motor or for one or more oscillation amplitudes, in each instance a measuring time or a measuring position be determined by the preceding measurements in such a way that the inductivity value L of the motor remains approximately constant even with changing current consumption and that, furthermore, the movement variable of the motor can be calculated from the electric characteristic by means of a constant inductivity value $L_{const}$.

FIG. 7 shows an exemplary small electric device 200, in this case an electric dry shaver, in which the described arrangement is used or which is equipped to carry out the described method. The small electric device 200 implemented as an electric shaver has a shaving head 201 in which a linearly oscillating direct drive activates a bottom blade against a shaving foil so that hair that protrudes through the shaving foil is cut or sheared off by the bottom blade in a known manner. The described arrangement for controlling the oscillating motor can be used in one such small electric device 200 or the small electric device 200 can be equipped to carry out the described method.

What is claimed is:

1. An arrangement having
an oscillating motor having one or more stator coils,
a control circuit to control the motor,
one or more connecting lines that connect the control circuit to said one or more stator coils, creating a stator coil connection; wherein the control circuit uses the stator coil connection to determine an electric characteristic of the motor at a predetermined measuring time or in a predetermined measuring position during an oscillation process, and
a processor to determine a movement variable of the motor by means of only information from the stator coil connection, including at least the electric characteristic and a constant inductivity value of the motor,
wherein the control circuit in the operating state controls the motor as a function of the movement variable, and the measuring time or the measuring position is predetermined such that the inductivity of the motor remains approximately constant at least in a given current interval, even with different currents through the motor and further, wherein the arrangement has a memory to store the measuring time or the measuring position.

2. The arrangement according to claim 1, wherein a measuring time or the measuring position is predetermined in each instance for at least two oscillation amplitudes of the motor, wherein the inductivity of the motor remains approximately constant at least in a current interval in terms of the measuring times or the measuring positions, even with different currents through the motor.

3. The arrangement according to claim 1, wherein the control circuit and/or the processor and/or the memory are implemented by means of a microcontroller.

4. A small electric device having an arrangement according to claim 1.

5. A shaver having an arrangement according to claim 1.

6. A toothbrush having an arrangement according to claim 1.

* * * * *